United States Patent
Ina et al.

(10) Patent No.: US 7,895,703 B2
(45) Date of Patent: Mar. 1, 2011

(54) BACKDOOR APPARATUS

(75) Inventors: Eiji Ina, Toyohashi (JP); Masaki Kobayashi, Toyohashi (JP); Tomoyuki Kikuta, Toyohashi (JP); Atsushi Katou, Toyohashi (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 1050 days.

(21) Appl. No.: 11/706,183

(22) Filed: Feb. 15, 2007

(65) Prior Publication Data

US 2007/0200389 A1 Aug. 30, 2007

(30) Foreign Application Priority Data

Feb. 24, 2006 (JP) .............................. 2006-048622
Dec. 18, 2006 (JP) .............................. 2006-339900

(51) Int. Cl.
*B60S 1/58* (2006.01)

(52) U.S. Cl. ............... 15/250.3; 15/250.31; 15/250.001; 296/96.15; 296/180.1; 296/152

(58) Field of Classification Search ............... 15/250.3, 15/250.31, 250.001, 250.16; 296/180.1, 296/146.8, 156, 152, 96.15, 96.17

See application file for complete search history.

(56) References Cited

U.S. PATENT DOCUMENTS

| 5,060,340 | A | * | 10/1991 | Grassini | .................. | 15/250.24 |
| 5,621,942 | A | * | 4/1997 | Eustache et al. | ........... | 15/250.3 |
| 6,637,801 | B1 | | 10/2003 | Eustache et al. | | |

FOREIGN PATENT DOCUMENTS

| JP | U-S55-066849 | | 5/1980 |
| JP | 60-135353 | * | 7/1985 |
| JP | U-H02-039907 | | 12/1990 |
| JP | U-H07-039734 | | 9/1995 |
| JP | A-2002-370626 | | 12/2002 |
| JP | A-2005-35005 | | 12/2005 |

* cited by examiner

*Primary Examiner*—Gary K Graham
(74) *Attorney, Agent, or Firm*—Posz Law Group, PLC

(57) ABSTRACT

A backdoor apparatus includes a backdoor panel, a rear spoiler and a wiper mechanism. The wiper mechanism includes a motor assembly, a wiper arm and a wiper blade. A motor installation recess is formed in a top portion of the backdoor panel to receive the motor assembly. The motor assembly includes a cover, which covers a portion of a motor, which is exposed from the rear spoiler. The cover has a flange, which covers a top end part of the glass. The cover, which includes the flange, does not contact the glass.

15 Claims, 13 Drawing Sheets

BACKDOOR APPARATUS

CROSS REFERENCE TO RELATED APPLICATION

This application is based on and incorporates herein by reference Japanese Patent Application No. 2006-48622 filed on Feb. 24, 2006 and Japanese Patent Application No. 2006-339900 filed on Dec. 18, 2006.

BACKGROUND OF THE INVENTION

1. Field of the Invention

The present invention relates to a backdoor apparatus for a vehicle.

2. Description of Related Art

For instance, Japanese Unexamined Patent Publication JP-A-2002-370626 (corresponding to Japanese Patent JP-B2-3838056) discloses a backdoor apparatus of a vehicle, such as a van, a station wagon, a hatchback car. In the disclosed backdoor apparatus, a top portion of a backdoor panel has a recess, which is recessed toward an interior side of the vehicle, and a rear wiper motor is installed in this recess from outside of the vehicle. After the installation of the motor into the recess, an outer panel (a rear spoiler) is installed to the backdoor panel.

With the above construction, the motor can be installed from the outside of the vehicle rather than from the inside of the vehicle, so that the installation operation is eased. Furthermore, it is not required to form an installation through hole in a backdoor outer plate of the backdoor panel to install the motor from the inside of the vehicle. Thus, the rigidity of the backdoor panel can be easily maintained.

Furthermore, Japanese Unexamined Utility Model Publication JP-U-H07-39734 discloses a vehicle roof spoiler, to which a rear window wiper system is installed. A wiper lift hook is provided in the roof spoiler to guide and receive a wiper arm of the wiper system in an interior of the roof spoiler.

With the above construction, the wiper arm and a wiper blade are hidden in the roof spoiler when the wiper is not in use. Thus, an appearance is improved. Furthermore, the wiper arm and the wiper blade are protected by the spoiler from, for example, sand, dust and harmful ultraviolet rays. Also, the wiper blade, which is lifted away from a surface of a rear window glass, is cleaned by an air flow, which is guided by the spoiler. In addition, in the assembling operation for installing the roof spoiler to the vehicle body, the rear window wiper system is simultaneously installed. Thus, the number of assembling steps and the number of components can be reduced, and thereby the manufacturing costs can be reduced.

Furthermore, Japanese Unexamined Patent Publication JP-A-2005-350005 discloses a rear spoiler apparatus, which includes a spoiler main body and a wiper mechanism for wiping a rear window glass. The spoiler main body includes a main body, which projects from a vehicle body surface and forms a receiving space therein. The main body forms an opening. A closer is provided to open and close the opening. The wiper mechanism is provided to the receiving space and can wipe the rear window glass through the opening when the closer is opened.

However, the above-described apparatuses have the following disadvantages. Specifically, in the backdoor apparatus of Japanese Unexamined Patent Publication JP-A-2002-370626, a pivot shaft of the motor projects through the rear spoiler. Thus, a wiper arm and a wiper blade are installable to the pivot shaft only after the installation of the motor and the rear spoiler to the backdoor panel. Also, the components, which need to be installed to the vehicle body, include the motor, the outer panel for covering the motor, the wiper arm and the wiper blade. Thus, the wiper mechanism cannot be handled as an integrated unit, and thereby the assembly still requires an additional installation time.

Also, in the backdoor apparatus recited in Japanese Unexamined Patent Publication JP-A-2002-370626, the wiper arm and the wiper blade, which are installed to the pivot shaft, can be easily viewed from the rear side of the vehicle in the wiper non-operational state. This construction deteriorates the appearance.

Furthermore, the opening of the roof spoiler of Japanese Unexamined Utility Model Publication JP-U-H07-39734 has a relatively large size, thereby deteriorating the appearance. In addition, at the time of washing the vehicle with the high pressure washer fluid, the motor itself and the output shaft of the motor may possibly get the washer fluid, thereby possibly damaging electrical components of the motor.

The rear spoiler apparatus of Japanese Unexamined Patent Publication JP-A-2005-350005 addresses the above disadvantage of Japanese Unexamined Utility Model Publication JP-U-H07-39734. However, in the rear spoiler apparatus of Japanese Unexamined Patent Publication JP-A-2005-350005, the closer, which opens and closes the opening, is provided, so that the costs are disadvantageously increased.

SUMMARY OF THE INVENTION

The present invention is made in view of the above disadvantages.

According to one aspect of the present invention, there is provided a backdoor apparatus for a vehicle. The backdoor apparatus includes a backdoor panel, a rear spoiler, a wiper blade and a motor assembly. The backdoor panel supports a vehicle rear window glass. The rear spoiler projects from a top portion of the backdoor panel. The wiper blade wipes the rear window glass. The motor assembly drives the wiper blade and is placed in a motor installation recess, which is formed externally in the top portion of the backdoor panel at a location below the rear spoiler. The motor assembly includes a motor and a cover. The motor has a pivot shaft, which is connected to the wiper blade to drive the wiper blade. The cover at least partially covers a rear part of the motor, which is located on a vehicle rear end side of the pivot shaft. The cover is arranged between the backdoor panel and the rear spoiler without directly contacting the rear window glass in such a manner that a portion of the cover at least partially overlaps with a top portion of the rear window glass in a direction generally perpendicular to a surface of the top portion of the rear window glass and is spaced from the top portion of the rear window glass.

According to another aspect of the present invention, there is also provided a backdoor apparatus for a vehicle. The backdoor apparatus includes a backdoor panel, a rear spoiler, a wiper blade and a motor assembly. The backdoor panel supports a vehicle rear window glass. The rear spoiler projects from a top portion of the backdoor panel. The wiper blade wipes the rear window glass. The motor assembly drives the wiper blade and is placed in a motor installation recess, which is formed externally in the top portion of the backdoor panel at a location below the rear spoiler. The rear spoiler includes a wiper receiving recess, which is opened on a vehicle rear end side of the wiper receiving recess. The wiper receiving recess at least partially overlaps with the motor installation recess of the backdoor panel in a direction generally perpendicular to a surface of a top portion of the rear window glass. The wiper blade is received in the wiper receiving recess when the wiper blade is placed in a predetermined rest position.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

A first embodiment of the present invention will be described with reference to FIGS. 1 to 7.

Figure 1:
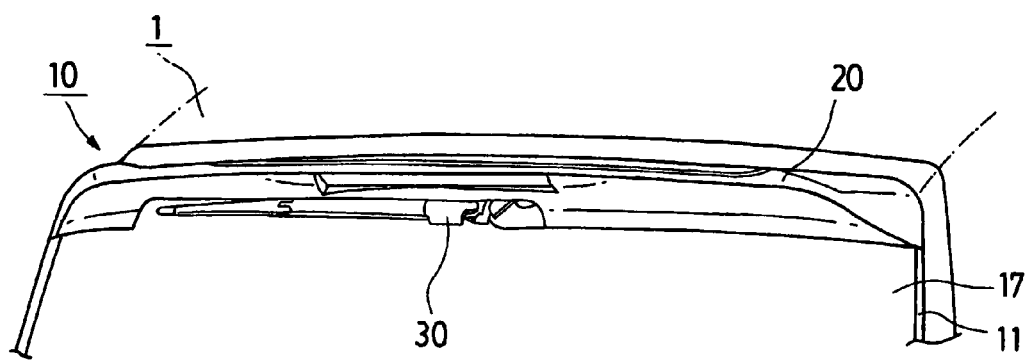
FIG. 1 is a rear perspective view showing a backdoor apparatus according to a first embodiment of the present invention.

As shown in FIG. 1, a backdoor apparatus 10 of the first embodiment is installed to a rear side of a body of a vehicle 1, such as a van, a station wagon, a hatchback car, in a manner that allows swing of the backdoor apparatus 10 to open and close a rear opening of the body of the vehicle 1. In the backdoor apparatus 10, a rear window glass 17 (hereinafter, simply referred to as a glass 17) is installed to a backdoor panel 11. Furthermore, a rear spoiler 20 and a wiper mechanism 30 are installed to a top portion of the backdoor panel 11.

The rear spoiler 20 projects rearward from a surface of the backdoor panel 11 on a vehicle rear end side to adjust the air flow at the rear end of the traveling vehicle. The wiper mechanism 30 of the present embodiment is for reciprocally wiping a surface of the glass 17.

Figure 2:
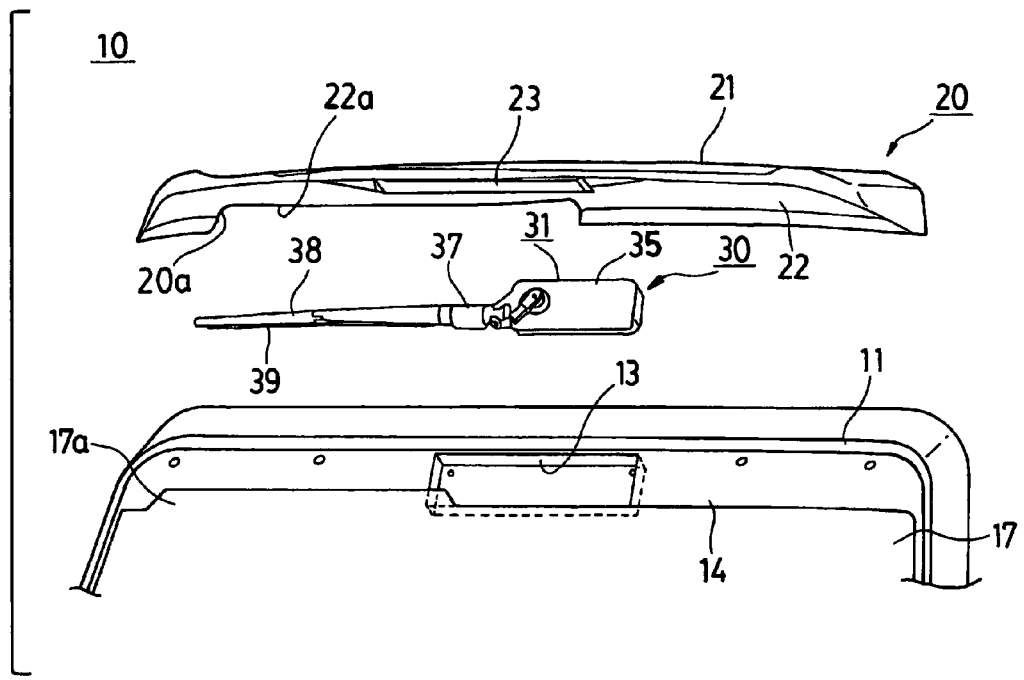
FIG. 2 is an exploded view of the backdoor apparatus of FIG. 1.

The backdoor panel 11 supports outer edges of a vehicle interior side inner surface of the glass 17, which has a generally rectangular shape. As shown in FIG. 2, in the backdoor apparatus 10, a recess (a motor installation recess) 13 and a protrusion 14 are formed in a vehicle top portion of the backdoor panel 11. The recess 13 is recessed toward the vehicle interior side, and the protrusion 14 is a remaining part of the top portion of the backdoor panel 11, which is other than the recess 13 and is not recessed toward to vehicle interior side. A motor assembly 31 of the wiper mechanism 30 is received and is fixed in the recess 13. The motor assembly 31 is installable to the recess 13 from the outside of the vehicle by, for example, screws or bolts. As described above, in the present embodiment, the motor assembly 31 is arranged on the exterior side of the backdoor panel 11, so that transmission of the wiper operational sound to a vehicle occupant can be substantially blocked or limited to improve a silence level in the vehicle interior, i.e., a passenger compartment of the vehicle.

A groove and a through hole are formed in a wall of the recess 13. The through hole extends through the wall to the vehicle interior side (not shown). A wiper harness (not shown) and a hose 2 (see FIG. 4) are externally pulled out from this through hole. The wire harness is used to provide an electric power to, for example, the motor assembly 31 of the wiper mechanism 30 and to a high mount stop lamp 23. The hose 2 is used to supply washer fluid to a washer nozzle 36d (see FIG. 3), which is formed integrally with the wiper mechanism 30.

After the installation of the wiper mechanism 30 to the recess 13, the rear spoiler 20 is installed to cover the wiper mechanism 30 and the recess 13.

The glass 17 has an extended portion 17a, which is formed by upwardly extending a part of the vehicle top side portion of the glass 17 (a left half side of the glass 17 in the present embodiment) from the rest of the glass 17. The extended portion 17a is formed into a trapezoidal shape, a long side of which is located at a bottom side thereof. A top side (a short side) of the trapezoidal extended portion 17a extends to a point, which is adjacent to a lateral side of the recess 13 of the backdoor panel 11 in a left-to-right direction of the vehicle. A vehicle center side end of the extended portion 17a covers a portion of the left end part of the recess 13.

The extended portion 17a forms a predetermined stop portion (a rest portion) of a wiper blade 38, on which the wiper blade 38 is stopped, i.e., is rested in the wiper non-operational period. A length of the extended portion 17a in the left-to-right direction of the vehicle is slightly longer than a length of the wiper blade 38 in the left-to-right direction of the vehicle upon placing the wiper blade 38 in the rest position.

The rear spoiler 20 is made of synthetic resin and has a generally triangular cross section. Furthermore, the rear spoiler 20 includes a topside section 21 and a backside section 22. The topside section 21 extends continuously from the vehicle roof generally in a horizontal direction. The backside section 22 has a predetermined curved form, which projects from the vehicle rear end side of the topside section 21 toward the glass 17.

The high mount stop lamp 23 is provided to a rear end side of a center part of the backside section 22, which is centered in the left-to-right direction of the vehicle. Furthermore, a generally rectangular shaped opening 22a is formed in the backside section 22 on the glass 17 side of the backside section 22. This opening 22a has a height that reach an intermediate point, which is intermediate between the glass 17 side end of the backside section 22 to a distal end of the backside section 22 (i.e., a connection between the backside section 22 and the topside section 21). The opening 22a also has a width, which is measured in the left-to-right direction of the vehicle and is generally one half of that of the backside section 22. The opening 22a includes a center of the backside section 22 and is placed on the left side of the vehicle.

The opening 22a is communicated with a wiper receiving recess 20a, which forms a wiper receiving space in the rear spoiler 20. When the rear spoiler 20 is installed to the backdoor panel 11, the wiper receiving recess 20a is communicated with the recess 13, which is formed in the backdoor panel 11. That is, a portion of the wiper receiving recess 20a overlaps with a portion of the recess 13 in a direction that is generally perpendicular to a surface of the top portion of the glass 17.

Figure 3:
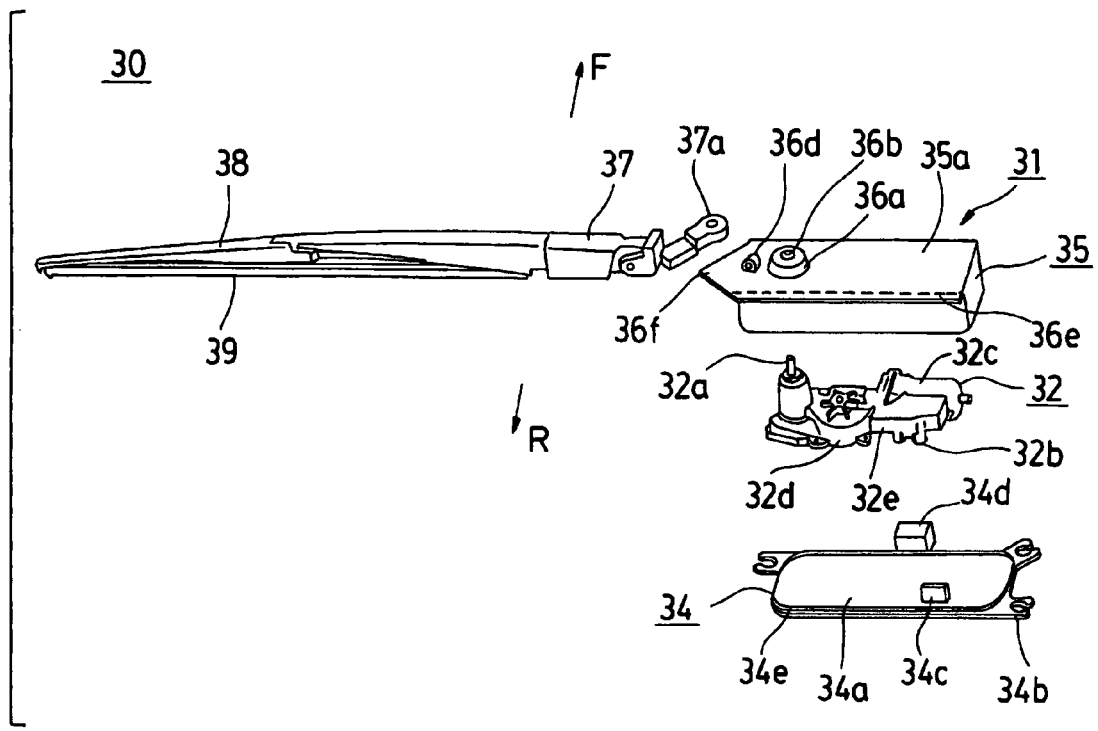
FIG. 3 is an exploded perspective view of a wiper mechanism of the backdoor apparatus according to the first embodiment.
Figure 4:
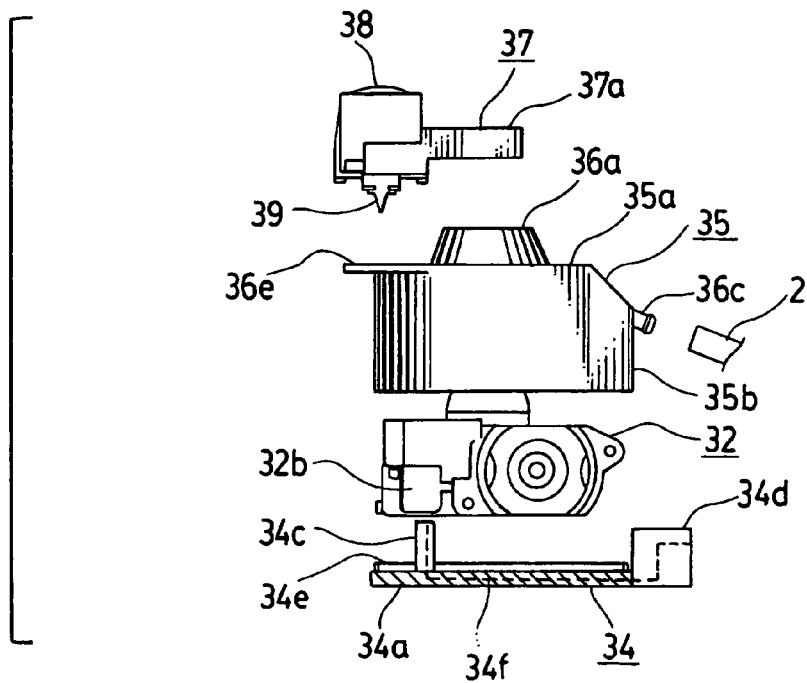
FIG. 4 is an exploded lateral side view of the wiper mechanism according to the first embodiment.

As shown in FIGS. 3 and 4, the wiper mechanism 30 includes the motor assembly 31, a wiper arm 37 and the wiper blade 38. When the wiper arm 37 is swung by the motor assembly 31, the wiper blade 38, which is installed to a distal end part of the wiper arm 37, wipes the surface of the glass 17.

The wiper blade 38 holds a wiper strip 39 made of rubber or resin in a replaceable manner. The wiper blade 38 is urged against the wiping surface side (the glass 17 surface side) by the wiper arm 37 such that the wiper strip 39 is urged against the surface of the glass 17 by the urging force of the wiper arm 37.

The motor assembly 31 includes a motor 32 and a housing (a cover) 35. The housing 35 is made of synthetic resin and covers around the motor 32. The motor 32 includes a motor main body 32c, a speed reducer 32d, a drive circuit 32e and a plate 34. The speed reducer 32d includes a speed reducing mechanism (a worm and a worm wheel). The plate 34 serves as a bracket, which closes a bottom opening of the speed reducer 32d. The motor 32 receives a power supply from a vehicle battery (not shown), which serves as a power source, to reciprocally rotate a pivot shaft 32a thereof, which projects in a direction away from the wiping surface. The motor 32 includes a connector 32b at a lower side of the drive circuit 32e.

Besides serving as the bracket, which closes the bottom opening of the speed reducer 32d, the plate 34 has a function of fixing the motor 32 to the recess 13. Bolt holes (not shown) are provided to the plate 34 to fix the plate 34 to a housing of the speed reducer 32d by bolts. Furthermore, the plate 34 has fixing portions 34b at three locations, respectively, along an outer peripheral edge of a generally rectangular planar portion 34a to fix the plate 34 to the recess 13. Furthermore, a connector 34c, which is connected to the motor 32, is provided to a location that is adjacent to a glass 17 side edge, i.e., a vehicle rear end side edge (a left side edge in FIG. 4) of the planar portion 34a to project upwardly toward the drive circuit 32e side. In the present embodiment, when the motor 32 is installed on the plate 34, the connector 34c is connected to the connector 32b of the drive circuit 32e.

Furthermore, in the plate 34, a connector 34d projects outward toward the vehicle front end side (the right side in FIG. 4) from the outer peripheral edge of the planar portion 34a on the side opposite from the glass 17, i.e., on the vehicle front end side. The connector 34d is connected to a wire harness, which is in turn connected to the power source.

The plate 34 of the present embodiment is made of synthetic resin, and electrical terminals 34f are insert molded in the plate 34 between the connector 34d and the connector 34c. With the above construction, when the vehicle side harness is connected to the connector 34d, which is formed at the outer peripheral edge of the planar portion 34a of the plate 34 on the side opposite from the glass 17, the electric power is supplied to the motor 32 through the electrical terminals 34f.

In this way, the vehicle side harness is connected to the connector 34d. Thus, an installation direction of this connector may be changed from the axial direction of the pivot shaft 32a to the direction perpendicular to the axis of the pivot shaft 32a. Therefore, the required depth, which is required to install to connector, may be reduced, and thereby the depth of the recess 13 may be reduced.

Furthermore, an installation frame 34e projects along the entire outer peripheral edge of the plate 34 on the motor 32 side (the upper side in FIG. 4). The installation frame 34e is configured to have a shape that generally coincides with an inner peripheral surface of the opposed opening of the housing 35. When the installation frame 34e is fitted to the inner peripheral wall of the housing 35, the housing 35 and the plate 34 are secured together. The securing method for securing the housing 35 and the plate 34 is not limited to this. For example, the housing 35 and the plate 34 may be secured together by bolts.

The housing 35 is formed as a box style lid, which has a receiving space therein. A protruding portion 36a, which protrudes in conformity with a shape of a pivot holder of the motor 32, is formed in a top surface 35a of the housing 35. A though hole 36b, through which the pivot shaft 32a projects outwardly, is formed through the protruding portion 36a.

A connection 36c, to which one end of the washer fluid conducting hose 2 is connected, is formed in a lateral surface 35b of the housing 35, which is located on the side (the right side in FIG. 4) opposite from the glass 17. The other end of the hose 2 is connected to a washer pump provided to the vehicle body side. A washer nozzle 36d is provided to the top surface 35a of the housing 35. A passage, i.e., a conduit (not shown), which is provided in the housing 35, communicates the washer nozzle 36d to the connection 36c. Thus, the washer fluid, which is pumped from the washer pump, is discharged from the washer nozzle 36d toward the surface of the glass 17 through the hose 2, the connection 36c and the above passage in the housing 35.

In the present embodiment, as discussed above, the washer nozzle 36d is formed integrally with the wiper mechanism 30, so that the installation of the washer nozzle 36d to the backdoor panel 11 is eased.

Furthermore, in the housing 35 of the present embodiment, a flange 36e projects from a glass 17 side (the left side in FIG.

4) edge of the top surface 35a beyond the lateral surface of the housing 35 toward the glass 17 side. The flange 36e is configured as a generally rectangular plate that projects from the top surface 35a.

Furthermore, another flange 36f is formed by extending the wiper arm 37 side (the left side in FIG. 3) edge of the top surface 35a in the left-to-right direction of the vehicle. The flange 36f is configured as a generally triangular projecting plate body. Specifically, a base side of the generally rectangular flange 36f forms a vehicle left side edge of the top surface 35a, and an apex of the flange 36f is spaced from the base side of the flange 36f in the left-to-right direction of the vehicle.

The housing 35 is integrated to form the motor assembly 31 by installing the speed reducer 32d of the motor 32 to the plate 34 and thereafter installing the housing 35 to the plate 34 to cover the motor 32.

In this state, the pivot shaft 32a projects through the through hole 36b at the top surface 35a. The wiper blade 38, which holds the wiper strip 39, is installed to the distal end part of the wiper arm 37. A wiper arm head 37a, which is formed in the base end of the wiper arm 37, is fixed to a protruded portion of the pivot shaft 32a, which protrudes outwardly from the through hole 36b.

In this way, the wiper mechanism 30 of the present embodiment can be handled as a unit or a module. In the present embodiment, the wiper mechanism 30 is installed to the recess 13 of the backdoor panel 11 from the outside of the vehicle. Thus, the installation of the wiper mechanism 30 is relatively easy. At this time, it is not required to receive the pivot shaft 32a through the glass 17, and thereby it is possible to maintain the strength of the glass 17.

Furthermore, according to the present embodiment, the wiper mechanism 30, in which the wiper arm 37 and the wiper blade 38 are fixed to the pivot shaft 32a, is installed to the backdoor panel 11. Thereafter, the rear spoiler 20 is installed to the backdoor panel 11. Thus, after the installation of the rear spoiler 20, it is not required to reinstall the wiper blade 38 to the pivot shaft 32a. Thus, the installation operation is promoted.

In addition, in the present embodiment, the wiper mechanism 30 is provided on the vehicle top end side of the top end part of the glass 17. Thus, the view of the vehicle occupant is not interrupted by the wiper mechanism 30, and thereby the good visibility of the vehicle occupant is ensured.

Also, at the wiper non-operational period, the wiper arm 37 and the wiper blade 38 are at least partially received in the wiper receiving recess 20a of the rear spoiler 20 in the rest state. In this way, the wiper mechanism 30 becomes less visible from the rear end side of the vehicle, so that the appearance of the rear part of the vehicle is improved.

The housing 35 of the present embodiment improves the assembling operation of the wiper mechanism 30 and improves the water proof performance of the motor 32. In addition, the housing 35 has a function of improving the field of the view of the vehicle occupant through the glass 17 by placing the wiper mechanism 30 above the top end part of the glass. In addition, the housing 35 may serve as a cover, which covers the motor 32 and improves the appearance of the fixing portions of the wiper mechanism 30. Furthermore, it is possible to provide an additional cover, which further covers the motor 32 to further improve the appearance of the fixing portions of the wiper mechanism 30.

Figure 5:
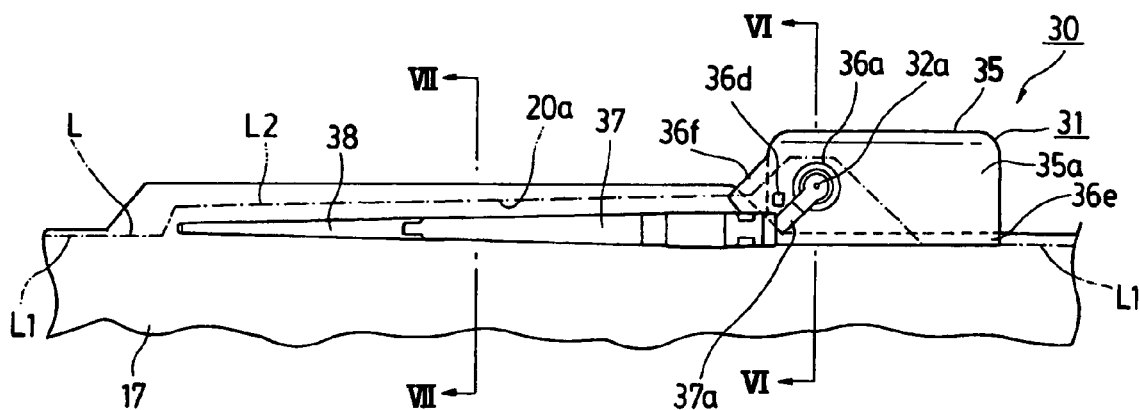
FIG. 5 is a descriptive view of the wiper mechanism of the first embodiment, which is held in a stop position.

As shown in FIG. 5, when the wiper mechanism 30 is installed to the recess 13 of the backdoor panel 11, the flange 36e and the flange 36f of the housing 35 cover the surface of the end part of the glass 17. That is, the flange 36e overlaps with the top end part of the glass 17, and the flange 36f overlaps with the oblique end part of the glass 17, which is located on the right side of the extended portion 17a. According to the present embodiment, even when the rain droplets are applied to the wiper mechanism 30 from the glass 17 side or the opposite side, which is opposite from the glass 17 side, the flanges 36e, 36f limit further intrusion of the rain droplets. In this way, according to the present embodiment, the intrusion of the rain droplets into the motor assembly 31 in the recess 13 is advantageously limited to improve the water proof performance.

Figure 6:
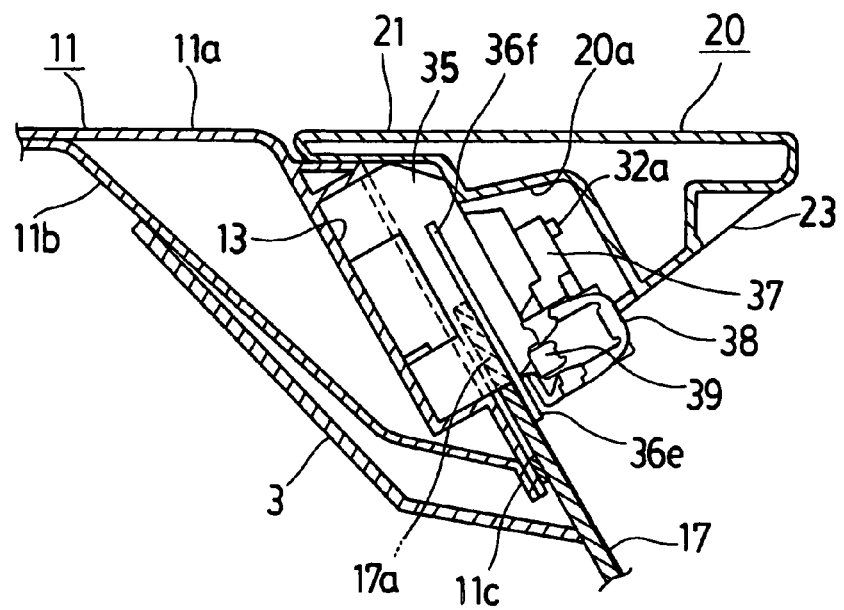
FIG. 6 is a cross sectional view taken along line VI-VI in FIG. 5.
Figure 7:
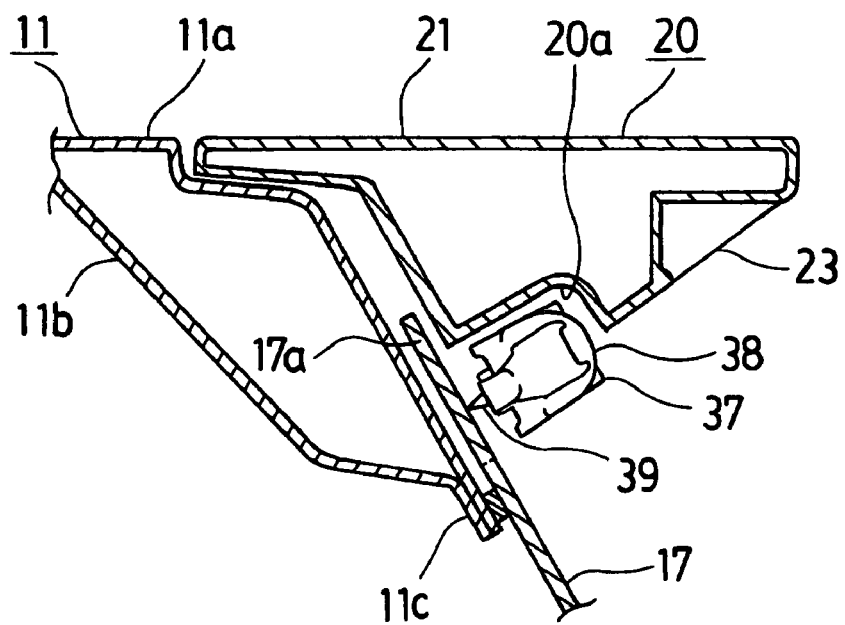
FIG. 7 is a cross sectional view taken along line VII-VII in FIG. 5.

FIG. 6 is a cross sectional view taken along line VI-VI in FIG. 5, and FIG. 7 is a cross sectional view taken along line VII-VII in FIG. 5. As shown in FIGS. 6 and 7, the backdoor panel 11 includes a backdoor outer plate 11a and a backdoor inner plate 11b. The backdoor panel 11 is connected to an outer peripheral edge portion of the glass 17 on the vehicle interior side at a connection 11c between the backdoor outer plate 11a and the backdoor inner plate 11b. The recess 13 is formed in the backdoor outer plate 11a. An interior panel 3 is provided on the vehicle interior side to cover the backdoor inner plate 11b and the outer peripheral edge portion of the glass 17 (the interior panel 3 being not depicted in FIG. 7 for the sake of simplicity). The region of the glass 17, which is covered with the interior panel 3, is formed as a black ceramic portion (a black ceramic border).

In FIG. 5, a dot-dash line L is a contact line (or a line that indicates a closest position) between the rear spoiler 20 and the glass 17 or the motor assembly 31. Hereinafter, this dot-dash line L will be referred to as the contact line L. The upper end of the glass 17, which includes the top end of the extended portion 17a, is located above the contact line L on the top end side of the backdoor panel 11 except a region around the pivot shaft 32a of the motor assembly 31.

A portion of the contact line L, along which the backside section 22 of the rear spoiler 20 and the glass 17 or the motor assembly 31 contact with each other or are closest to each other, will be referred to as a contact line L1. Furthermore, another portion of the contact line L, along which the wiper receiving recess 20a and the glass 17 or the motor assembly 31, contact with each other or are closest to each other, will be referred to as a contact line L2. In this case, the contact line L2 is placed above the contact line L1 on the top end side of the backdoor panel 11.

The extended portion 17a (and a portion of the motor assembly 31) forms a bottom surface of the wiper receiving recess 20a (specifically, a surface of the wiper receiving recess 20a on a lower side in an axial direction of the pivot shaft 32a) and extends above the contact line L2 on the top end side of the backdoor panel 11.

As shown in FIG. 5, at the wiper non-operational period, the wiper blade 38 is substantially received in the extended portion 17a. Thus, the wiper strip 39 is always held in contact with the surface of the glass 17. Therefore, at the time of starting or ending the wiper operation, when the wiper blade 38 is moved between the rest position in the wiper receiving recess 20a and the wiping position for wiping the glass 17, a generally constant wiping pressure of the wiper strip 39 can be maintained. In this way, noise generation during the wiper operational period can be advantageously limited.

The present invention is not limited to the above embodiment, and the above embodiment may be modified as follows without departing from the scope of the present invention. In the following description, components, which are similar to those of the above embodiment, will be indicated by the same numerals and will not be described further.

In the first embodiment, the flanges 36e, 36f of the housing 35 are used to improve the water proof performance for protecting the motor assembly 31 from the water. This construction may be modified in a manner shown in FIGS. 8 to 11.

In the modification shown in FIGS. 8 to 11, an arm cover 40 is formed integrally with the housing 35. In the present modification, the arm cover 40 is formed integrally at the top surface 35a of the housing 35. In place of this construction, a separate arm cover 40, which is formed separately from the housing 35, may be provided and may be fixed to the housing 35 or the plate 34.

The arm cover 40 of the present modification includes an arm cover main body 41, a flange 42 and a flange 43. The arm cover main body 41 extends from the top surface 35a of the housing 35 in the axial direction of the pivot shaft 32a. The arm cover main body 41 covers a vehicle right side portion (a right side portion in FIG. 3) of the protruding portion 36a and also covers a side (a top side in FIG. 3) of the protruding portion 36a, which is opposite from the glass 17. Furthermore, the arm cover main body 41 extends from the protruding portion 36a on the vehicle left side. The portion of the arm cover main body 41, which extends on the vehicle left side, extends from a portion of an inner surface of the wiper receiving recess 20a, which is opposite from the glass 17, toward the vehicle rear end side to cover a top side (a front side in FIG. 2) of the opening 22a. In this way, when the wiper arm 37 and the wiper blade 38 are placed in the rest position, the arm cover main body 41 covers a vehicle front end side (side opposite from the glass 17) and a top side of the wiper arm 37 and a vehicle front end side (side opposite from the glass 17) and a top side of the wiper blade 38.

In the portion of the arm cover main body 41, which extends toward the vehicle left side and covers the wiper arm 37 and the wiper blade 38, an upper end of the arm cover main body 41 reaches a top wall surface, which forms a ceiling of the wiper receiving recess 20a, and a lower end of the arm cover main body 41 reaches the surface of the glass 17. The arm cover main body 41 forms a wall on the vehicle front end side (side opposite from the glass 17) of the wiper arm 37 and the wiper blade 38 to block the wiper receiving recess 20a by extending the wall in the height direction (the direction generally parallel to the axial direction of the pivot shaft 32a).

Figure 8:
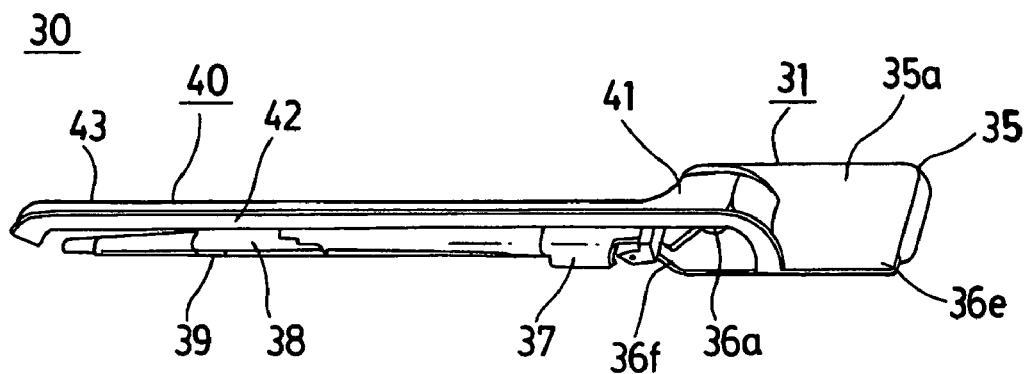
FIG. 8 is a perspective view showing a portion of the wiper mechanism in a modification of the first embodiment.
Figure 11:
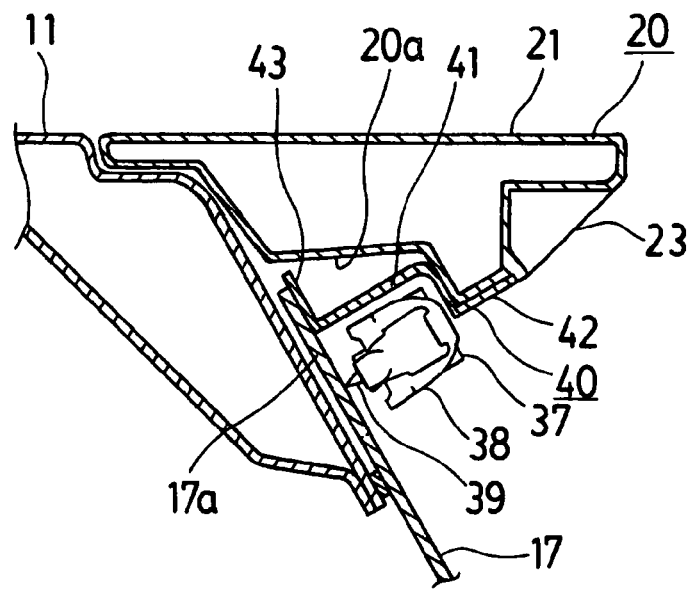
FIG. 11 is a cross sectional view taken along line XI-XI in FIG. 9.

As shown in FIGS. 8 and 11, the flange 42 extends from the glass 17 side end of the arm cover main body 41 such that the flange 42 closely contacts and covers a peripheral edge of the opening 22a of the backside section 22 of the rear spoiler 20. Furthermore, the other flange 43 extends from the opposite end of the arm cover main body 41, which is opposite from the glass 17, toward the opposite direction (toward the vehicle front end side), which is opposite from the glass 17 such that the flange 43 closely contacts and covers the top surface of the top end part of the extended portion 17a.

Figure 9:
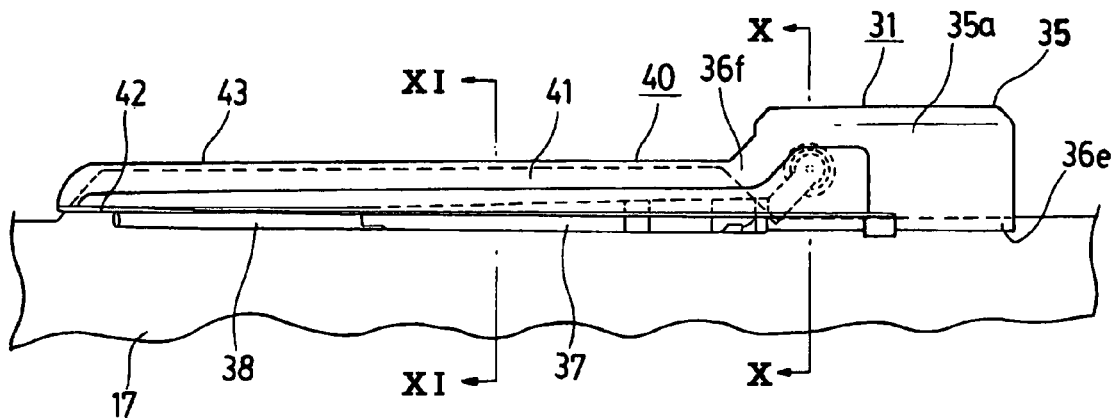
FIG. 9 is a descriptive view of the wiper mechanism of FIG. 8.
Figure 10:
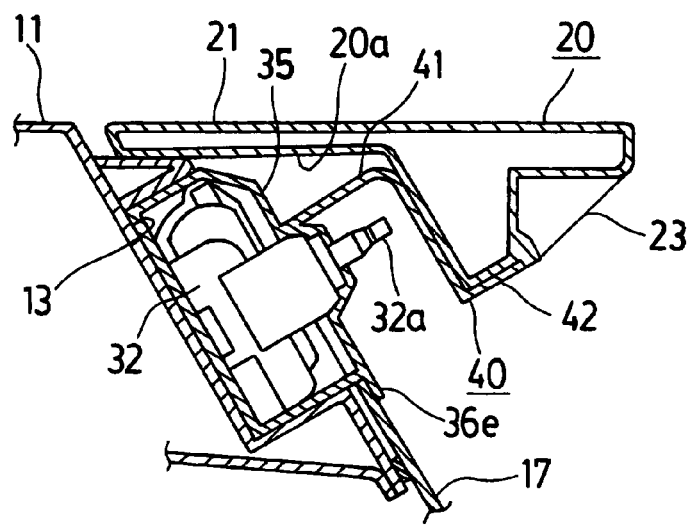
FIG. 10 is a cross sectional view taken along line X-X in FIG. 9.

FIG. 10 is a cross sectional view taken along line X-X in FIG. 9, and FIG. 11 is a cross sectional view taken along line XI-XI in FIG. 9. As shown in FIGS. 10 and 11, the flange 42 overlaps with the peripheral edge and its adjacent region of the opening 22a of the backside section 22 of the air spoiler 20 and limits intrusion of the rain droplets and the like to the inner surface of the rear spoiler 20 (the side of the rear spoiler 20, which forms the wiper receiving recess 20a).

Furthermore, the flange 43 overlaps with the end of the extended portion 17a of the glass 17 and limits intrusion of the rain droplets and the like, which are conducted from the top side of the backdoor panel 11, to the glass 17 side and the pivot shaft 32a side.

As described above, according to the present modification, the arm cover 40 is provided in addition to the flanges 36e, 36f of the above embodiment, so that the intrusion of the rain droplets and the like to the electrical components can be advantageously limited to improve the water proof performance.

Second Embodiment

Next, a second embodiment of the present invention will be described with reference to FIGS. 12 to 17. In the following description, components, which are similar to those of the first embodiment, will be indicated by the same numerals and will not be described further.

Figure 12:
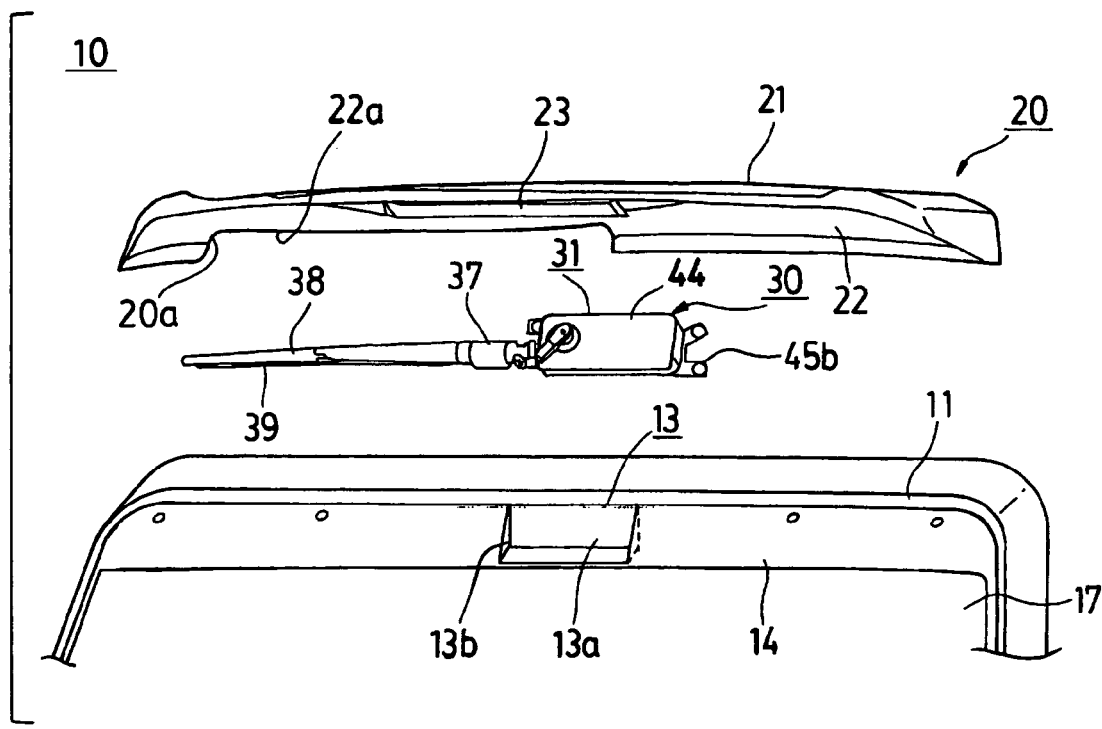
FIG. 12 is an exploded perspective view of the backdoor apparatus according to a second embodiment of the present invention.

The basic structures of the backdoor panel 11, the glass 17 and the rear spoiler 20 are the same as those of the first embodiment. As shown in FIG. 12, a recess (a motor installation recess) 13 and a protrusion 14 are formed in a vehicle top portion of the backdoor panel 11. The recess 13 is recessed toward the vehicle interior side, and the protrusion 14 is a remaining part of the top portion of the backdoor panel 11, which is other than the recess 13 and is not recessed toward to vehicle interior side. A surface of the recess 13, which is furtherest from a rear end opening of the recess 13 on the vehicle front end side, forms a front wall 13a. Two opposed surfaces, which are opposed to each other in the left-to-right direction of the vehicle and connect between the front wall 13a and the protrusion 14, form two opposed lateral walls 13b, respectively.

Figure 13:
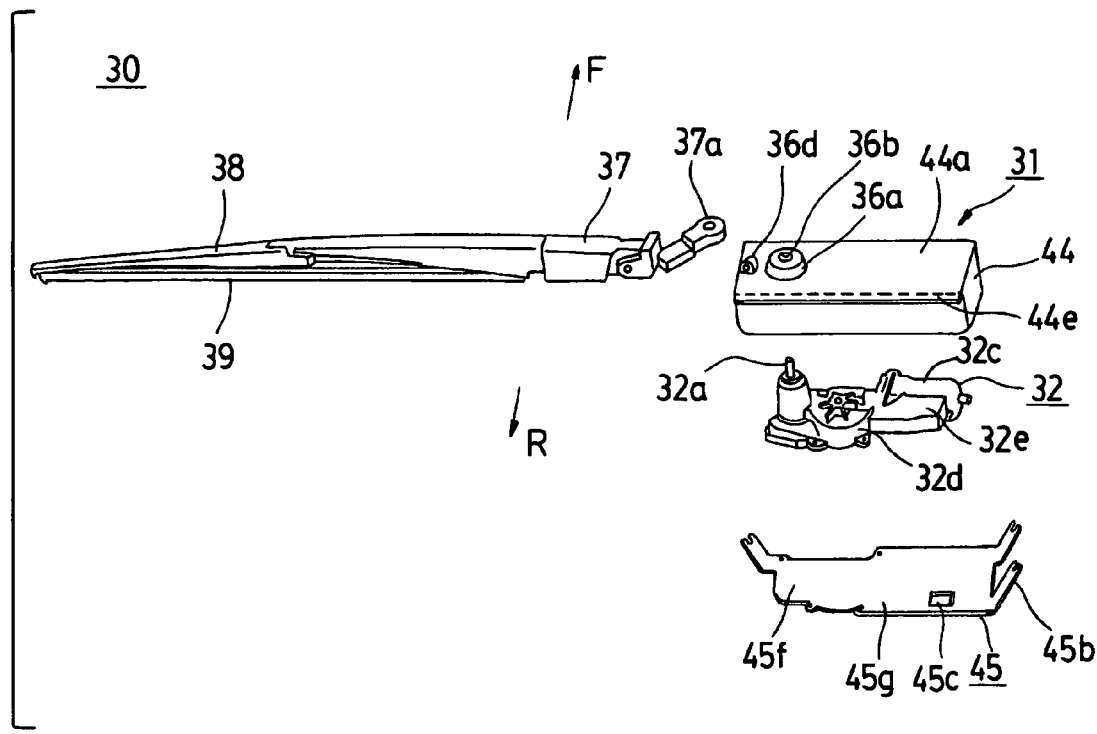
FIG. 13 is an exploded perspective view of the wiper mechanism of the backdoor apparatus according to the second embodiment.

As shown in FIGS. 12 to 13, the wiper mechanism 30 of the present embodiment includes the motor assembly 31, the wiper arm 37 and the wiper blade 38. The basic structures of the wiper arm 37 and the wiper blade 38 are the same as those of the first embodiment.

The motor assembly 31 includes a motor 32 and a cover (a housing) 44. The cover 44 is made of synthetic resin and covers the motor 32. In the present embodiment, a plate 45 is provided in place of the plate 34 of the first embodiment shown in FIGS. 3 and 4.

As shown in FIG. 13, the plate 45 is made of a generally rectangular plate and includes a motor bracket portion 45f, fixing portions 45b and an extension 45g. The motor bracket portion 45f closes the bottom opening of the speed reducer 32d, and the fixing portions 45b are used to fix the plate 45 to the backdoor panel 11. Furthermore, the extension 45g connects between the motor bracket portion 45f and the fixing portions 45b to extend the plate 45 to the fixing portions 45b.

Furthermore, a connector 45c, which is connected to the motor 32, is formed to project toward the drive circuit 32e at a location adjacent to the edge of the extension 45g, which is located on the glass 17 side of the extension 45g. In the present embodiment, when the motor 32 is installed to the plate 45, the connector 45c is connected to a connector (not shown) of the drive circuit 32e. Another connector and electrical terminals, which are used to connect the power source to the wire harness, are the same as the connector 34d and the electrical terminals 34f of the first embodiment and therefore will not be described and depicted in the present embodiment.

When the plate 45 is installed to the motor 32 and the cover 44, the fixing portions 45b are placed outward of the motor 32 and the cover 44. Furthermore, when the motor bracket portion 45f and the extension 45g contact the front wall 13a of the recess 13 of the backdoor panel 11, the fixing portions 45b contact and are fixed to the lateral walls 13b by bolts. In order to permit the fixing of the fixing portions 45b to the lateral walls 13b, the fixing portions 45b are angled at a predetermined degree relative to the motor bracket portion 45f and the extension 45g.

Figure 14:
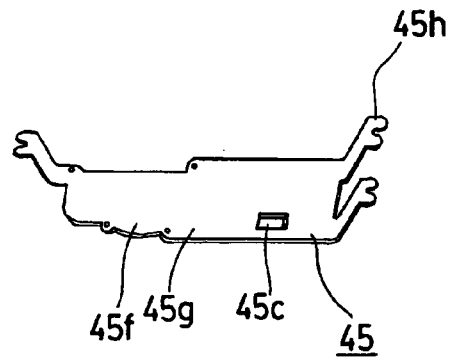
FIG. 14 is a perspective view showing another example of a plate of the wiper mechanism according to the second embodiment.

In place of the fixing portions 45*b* of FIG. 13, fixing portions 45*h* shown in FIG. 14 may be provided. Specifically, as shown in FIG. 14, the fixing portions 45*h* are bent at the predetermined angle relative to the motor bracket portion 45*f* and the extension 45*g* and thereafter are bent once again in parallel with the motor bracket portion 45*f* and the extension 45*g*. The plate 45, which has the fixing portions 45*h*, can be fixed to the recess 13 when the fixing portions 45*h* are fixed by bolts to the protrusion 14, which is located outside of the recess 13.

When the plate 45 is installed to the motor 32, the speed reducer 32*d* is fixed to the motor bracket portion 45*f*, and the motor main body 32*c* and the drive circuit 32*e* are placed on the extension 45*g*. At this time, the connector 45*c* is connected to the connector (not shown), which is formed at the lower part of the drive circuit 32*e* in a manner similar to the connector 32*b* of the first embodiment.

The cover 44 is made of synthetic resin and is formed as a box style lid, which has a bottom opening at its lower end and forms a receiving space therein. The protruding portion 36*a*, the through hole 36*b* and the washer nozzle 36*d*, which are similar to those of the first embodiment, are formed in a top surface 44*a* of the cover 44. Furthermore, the cover 44 has the connection 36*c*, which is similar to that of the first embodiment.

The cover 44 of the present embodiment has a flange 44*e*, which is formed by extending the edge of the top surface 44*a* of the cover 44 on the glass 17 side. The flange 44*e* is configured as a generally rectangular plate that projects from the top surface 44*a*.

Figure 15:
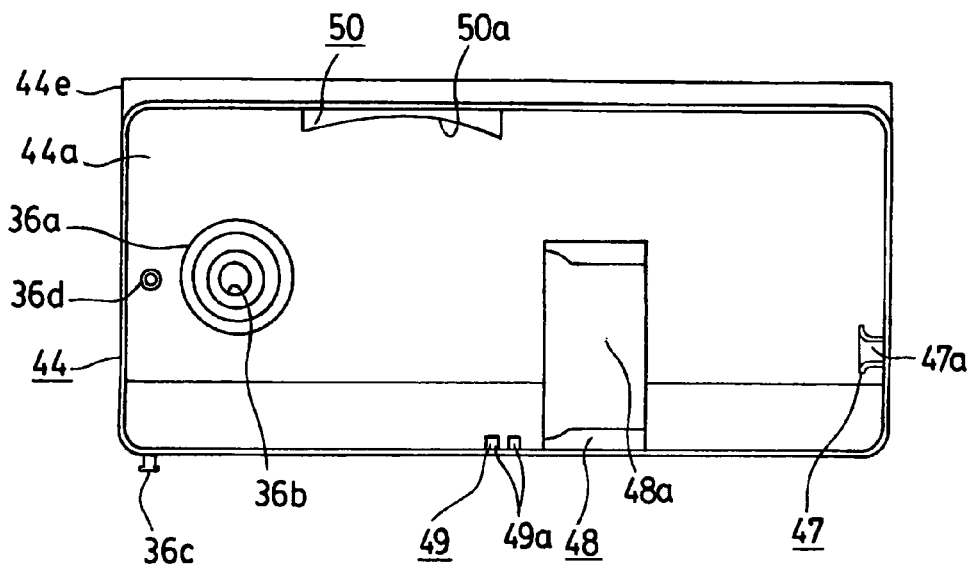
FIG. 15 is a bottom view of a cover according to the second embodiment.

As shown in FIG. 15, engaging portions 47-50 project from an inner surface of the cover 44 to fix the cover 44 to the motor 32.

Here, the engaging portions 47-49 are used to fix the motor main body 32*c* to the cover 44. Specifically, the engaging portion 47 is formed in a lateral surface of the cover 44, which forms one of shorter sides of the generally rectangular cover 44. The engaging portion 47 has a generally semi-cylindrical engaging surface 47*a*, which is engageable with a projection of a bearing formed in a bottom wall of the yoke housing of the motor main body 32*c*. An arc of the semi-cylindrical engaging surface 47*a* extends along an imaginary circle that has a diameter, which is slightly smaller than an outer diameter of the projection of the bearing of bottom wall of the yoke housing. The engaging surface 47*a* is opened on the side where the opening of the cover 44 is located. When the projection of the bearing of the motor main body 32*c* is press fitted to the engaging surface 47*a*, the engaging surface 47*a* is engaged with the projection of the bearing of the motor main body 32*c*.

The engaging portion 48 is provided generally at the longitudinal center of the cover 44 in the lateral surface of the cover 44, which is opposite from the flange 44*e*. The engaging portion 48 has a generally semi-cylindrical engaging surface 48*a*, which is engageable with the yoke housing of the motor main body 32*c*. An arc of the semi-cylindrical engaging surface 48*a* is formed along an imaginary circle, which has a diameter that is slightly smaller than an outer diameter of the yoke housing. The engaging surface 48*a* is opened on the side where the opening of the cover 44 is located. When the yoke housing of the motor main body 32*c* is press fitted to the engaging surface 48*a* of the engaging portion 48, the engaging portion 48 clamps the yoke housing.

The engaging portion 49 is provided generally at the longitudinal center of the cover 44 in the lateral surface of the cover 44, which is opposite from the flange 44*e*. The engaging portion 49 has two wall parts 49*a* to clamp a flange of the motor main body 32*c*, which is located between the motor main body 32*c* and the speed reducer 32*d*. These wall parts 49*a* extend from the opening of the cover 44 toward the top surface 44*a*. When the motor 32 is press fitted, these wall parts 49*a* clamp the flange of the motor main body 32*c*.

The engaging portion 50 is provided to a flange 44*e* side lateral surface of the cover 44 at a location, which is on a protruding portion 36*a* side of the longitudinal center of the cover 44. The engaging portion 50 has a generally arcuate lateral wall surface 50*a*, which provides a support from the flange 44*e* side to a circular portion of the speed reducer 32*d*, which covers the worm wheel.

Figure 17:
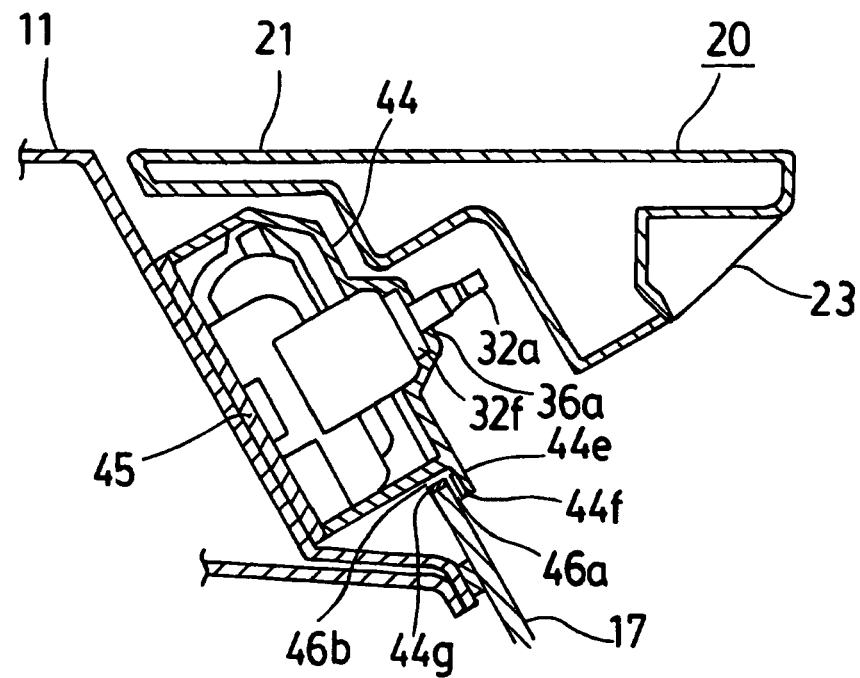
FIG. 17 is a cross sectional view taken along line XVII-XVII in FIG. 16.

As shown in FIG. 17, the protruding portion 36*a* is formed into a generally frustum shape, which has an increasing diameter toward a lower end thereof, to engage with the bearing portion 32*f* that supports the pivot shaft 32*a*.

As described above, the engaging portions 47-50 and the protruding portion 36*a* are formed, so that when the motor 32 is press fitted to the cover 44, the cover 44 is fixed to the motor 32. In the present embodiment, the cover 44 is fixable to the yoke housing of the motor main body 32*c* and the housing of the speed reducer 32*d*. Alternatively, grooves and/or engaging claws may be provided along the peripheral edge of the opening end of the cover 44 to clamp the plate 45 to fix the cover 44 to the plate 45. Further alternatively, bolt holes may be formed along the peripheral edge of the opening end of the cover 44 to fix the cover 44 to the plate 45 by bolts.

The above motor 32 and the cover 44 are assembled together by fixing the plate 45 to the speed reducer 32*d* of the motor 32 by bolts and then press fitting the motor 32 to the cover 44.

In this state, the pivot shaft 32*a* is received through the through hole 36*b* of the top surface 44*a*. The wiper blade 38, which holds the wiper strip 39, is installed to the distal end part of the wiper arm 37. The wiper arm head 37*a*, which is formed in the base end of the wiper arm 37, is fixed to a protruded portion of the pivot shaft 32*a*, which protrudes outwardly from the through hole 36*b*.

In this way, the wiper mechanism 30 of the present embodiment can be handled as a unit or a module In the present embodiment, the wiper mechanism 30 is installed to the recess 13 of the backdoor panel 11 from the outside of the vehicle. Thus, the installation of the wiper mechanism 30 is relatively easy. At this time, it is not required to receive the pivot shaft 32*a* through the glass 17, and thereby it is possible to maintain the strength of the glass 17.

Furthermore, in the present embodiment, the cover 44 is fixed to the plate 45, which serves as the housing of the motor 32 or the bracket of the motor 32. Thus, the size of the cover 44 can be reduced. Furthermore, the cover 44 can be easily standardized.

The wiper mechanism 30 of the present embodiment is installed to the recess 13 of FIG. 12 through the fixing portions 45*b* of the plate 45. At this time, each of the fixing portions 45*b* is fixed to a corresponding portion (the corresponding lateral wall 13*b* in the present embodiment) of the recess 13, which is other than the front wall 13*a* of the recess 13. In the case where the plate 45 has the fixing portions 45*h*, the fixing portions 45*h* are fixed to the protrusion 14, which is located outward of the lateral walls 13*b*.

In this way, the fixing space may be increased, and thereby the rigidity of the cover 44 and/or the plate 45 may be increased to limit vibration of the cover 44 caused by the wiping operation of the wiper blade 38.

As shown in FIG. 17, in the wiper mechanism 30 of the present embodiment, the lateral surface of the cover 44 is spaced from the upper end surface of the glass 17, which extends generally parallel to the axis of the pivot shaft 32a, in the plane of the top portion of the glass 17.

Figure 16:
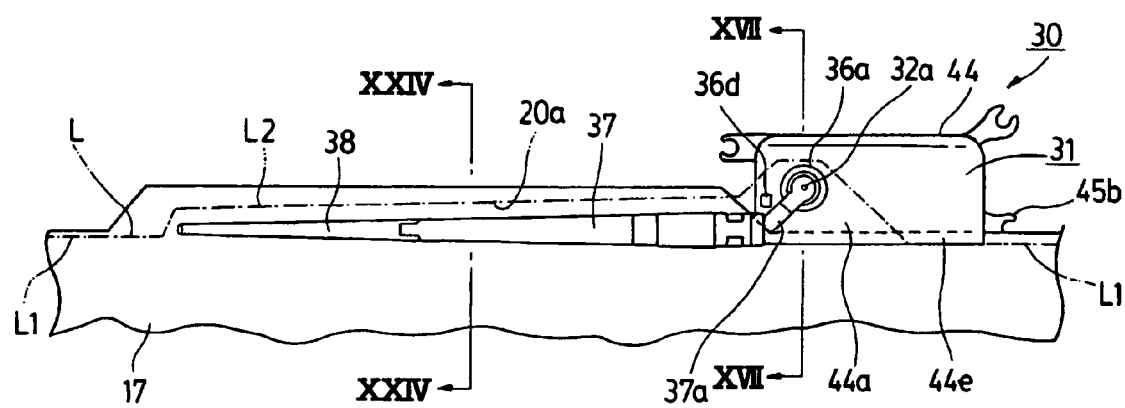
FIG. 16 is a descriptive view of the wiper mechanism in a stop position according to the second embodiment.

Thus, when the wiper mechanism 30 of the present embodiment is installed to the recess 13 of the backdoor panel 11 in the manner shown in FIG. 16, the cover 44 is fixed without contacting the glass 17, as shown in FIG. 17. Specifically, the flange 44e of the cover 44 is placed above the glass 17. The flange 44e partially overlaps with the top portion of the glass 17 in the direction generally perpendicular to the plane (surface) of the top portion of the glass 17 and is spaced from the top portion of the glass 17. The distal end portion of the flange 44e is in parallel with the glass 17, which extends from the side opposite from the flange 44e. In this way, the distal end portion of the flange 44e and the glass 17 are arranged such that a space 46a, which is parallel with the top portion of the glass 17, is interposed between the distal end portion of the flange 44e and the glass 17 to form the two layers without contacting with each other. The upper end surface of the glass 17 and the opposed lateral surface of the cover 44 are also in parallel with each other such that a space 46b, which extends in the direction generally perpendicular to the plane of the top portion of the glass 17, i.e., extends in the direction generally parallel to the axis of the pivot shaft 32a, is interposed between the upper end surface of the glass 17 and the opposed lateral surface of the cover 44 without contacting with each other.

At the time of traveling of the vehicle and at the time of driving of the wiper mechanism 30, the vibration of the motor 32 is conducted to the cover 44 and the flange 44e, and the vibration of the vehicle is conducted to the glass 17. Thus, the vibration of the cover 44 and the flange 44 differs from the vibration of the glass 17. However, the space 46a is provided between the flange 44e and the glass 17 to keep them apart from each other, and the space 46b is provided between the lateral surface of the cover 44 and the glass 17 to keep them apart from each other. Thus, these spaces 46a, 46b can effectively limit generation of unexpected vibration. Furthermore, the appearance of the back side of the vehicle is improved, and the water proof performance against the high pressure car washing is implemented.

An elongated strip like elastic member 44f, which is made of rubber or elastic resin and has a width smaller than that of the flange 44e, is fixed to the surface of the flange 44e, which is opposed to glass 17, as shown in FIG. 17. Alternatively, instead of fixing the elastic member 44f to the flange 44e, the elastic member 44f may be fixed to the surface of the glass 17, which is opposed to the flange 44e.

Furthermore, as shown in FIG. 17, another elongated strip like elastic member 44g is fixed to the upper end surface of the glass 17 to oppose the lateral surface of the cover 44. Alternatively, the elastic member 44g may be fixed to the lateral surface of the cover 44 at a location where the plane of the top portion of the glass 17 intersects with the lateral surface of the cover 44.

In the present embodiment, the elastic member 44f and the elastic member 44g are provided at the two locations, respectively. Alternatively, the elastic member, such as the elastic member 44f, which is fixed to the surface parallel to the plane of the top portion of the glass 17, may be provided alone, or the elastic member, such as the elastic member 44g, which is fixed to the surface (e.g., the vertical surface) that is not parallel to the plane of the top portion of the glass 17, may be provided alone.

Therefore, at the time of wiping the glass 17 by the wiper mechanism 30, even when the vibration of the cover 44 is relatively strong, the contact may be made only between the elastic member 44f and the glass 17, and thereby it is possible to limit direct contact between the cover 44 and the glass 17.

Furthermore, the elastic member 44g is placed at the location where the space 46b, which extends parallel to the pivot shaft 32a, is blocked. Thus, lateral vibration of the motor assembly 31 about the pivot shaft 32a can be advantageously absorbed by the elastic member 44g.

Furthermore, according to the present embodiment, the wiper mechanism 30, in which the wiper arm 37 and the wiper blade 38 are fixed to the pivot shaft 32a, is installed to the backdoor panel 11. Thereafter, the rear spoiler 20 is installed to the backdoor panel 11. Thus, after the installation of the rear spoiler 20, it is not required to reinstall the wiper blade 38 to the pivot shaft 32a. Thus, the installation operation is promoted.

Furthermore, in the present embodiment, the wiper mechanism 30 is arranged on the vehicle top end side of the top part of the glass 17. Thus, the view of the vehicle occupant is not interrupted by the wiper mechanism 30, and thereby the good visibility of the vehicle occupant is ensured.

Furthermore, at the wiper non-operational period, the wiper arm 37 and the wiper blade 38 are at least partially received in the wiper receiving recess 20a of the rear spoiler 20 in the rest state. In this way, the wiper mechanism 30 becomes less visible from the rear side of the vehicle, so that the appearance of the rear part of the vehicle is improved.

The structures of the backdoor panel 11 and the interior panel 3 as well as the relationships between the contact line L of FIG. 5 and the corresponding components are the same as those described in the first embodiment.

The present invention is not limited to the above-described second embodiment, and the second embodiment may be modified as follows without departing from the scope of the present invention. In the following description, components, which are similar to those of the second embodiment, will be indicated by the same numerals and will not be described further.

In the second embodiment, the cover 44 is formed as the box style lid, which can generally entirely cover the motor 32. However, the cover 44 may be modified in a manner described with reference to FIGS. 18 to 22 in the following first modification of the second embodiment.

Figure 18:
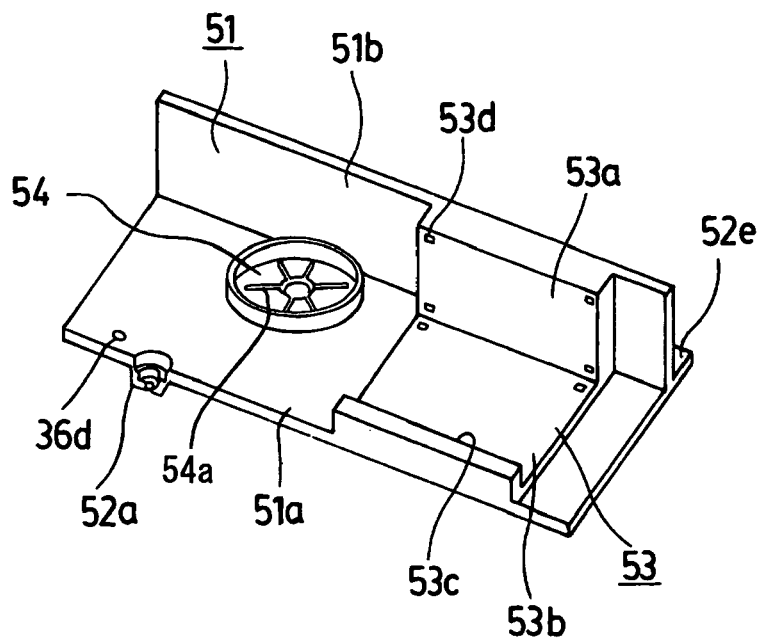
FIG. 18 is a perspective view of a cover in a first modification of the second embodiment.
Figure 19:
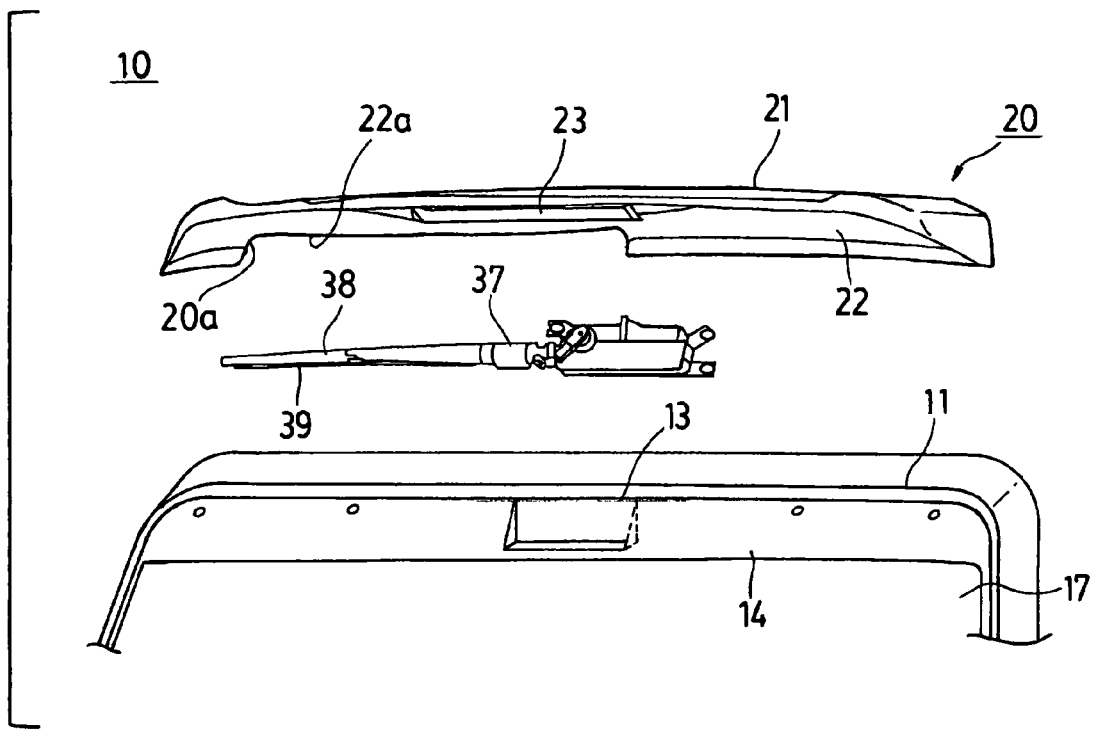
FIG. 19 is a rear perspective view of the backdoor apparatus in the first modification of the second embodiment.
Figure 20:
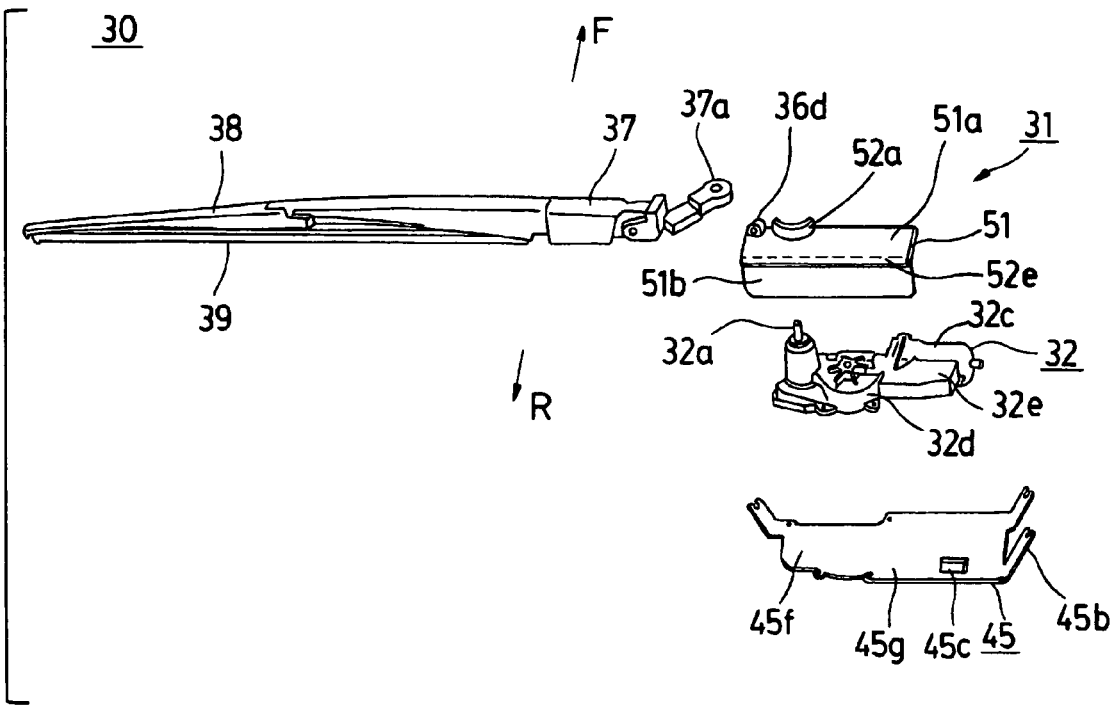
FIG. 20 is a perspective exploded view of the wiper mechanism in the first modification of the second embodiment.
Figure 21:
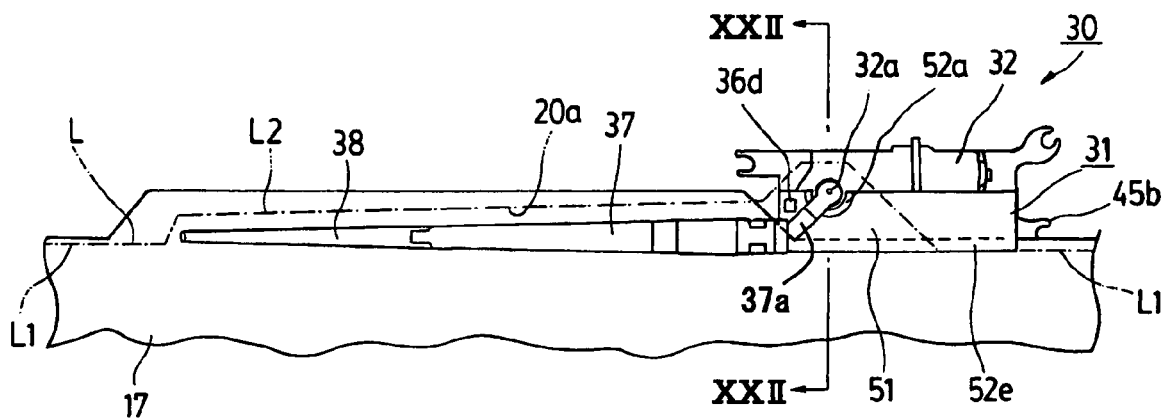
FIG. 21 is a descriptive view of the wiper mechanism in the stop position in the first modification of the second embodiment.

In the first modification shown in FIGS. 18 to 20, a cover 51 is formed as a half-cover, which covers about upper two third of a glass 17 side half of the motor 32.

The cover 51 of the first modification is made of synthetic resin and has an L-shaped cross section where a lateral wall 51b of a generally rectangular plate form extends perpendicular at a longitudinal side of a top wall 51a of a generally rectangular plate form. As shown in FIG. 20, a protruding portion 52a and the washer nozzle 36d, which is similar to that of the first embodiment, are formed in the top wall 51a.

As shown in FIG. 18, engaging portions 53, 54 project from an inner surface of the cover 51 to fix the cover 51 to the motor 32.

The engaging portion 53 projects continuously from the top wall 51a and the lateral wall 51b. Furthermore, the engaging portion 53 has a generally U-shaped engaging surface to clamp the drive circuit 32e therein. This engaging surface includes three engaging surface sections 53a, 53b, 53c, which are engaged with the vehicle rear end side lateral surface (the glass 17 side lateral surface), the top surface and the vehicle front end side lateral surface (the lateral surface opposite from the glass 17), respectively, of the drive circuit 32e. A space between the engaging surface section 53a and the engaging surface section 53c has a length, which is substantially the same as a width of the drive circuit 32e in the direction of the plane of the top portion of the glass 17 to permit the engagement of the top surface of the drive circuit 32e with the engaging portion 53.

Furthermore, engaging holes 53d are provided to four corners of each of the engaging surface sections 53a, 53b, 53c, respectively. Engaging claws (not shown), which project from the corresponding points of the drive circuit 32e, are engaged with the engaging holes 53d, respectively, so that the engaging portion 53 is fixed to the drive circuit 32e.

The engaging portion 54 is formed in the top wall 51a of the cover 51 at a location adjacent to the lateral wall 51b. Furthermore, the engaging portion 54 is formed into a generally hollow cylindrical body that is engaged with the circular portion of the speed reducer 32d, which covers the worm wheel. A groove 54a is formed in the lower side surface (top side surface in FIG. 18) of the engaging portion 54 to engage with a projection that is formed in a top surface of the circular portion of the speed reducer 32d, which covers the worm wheel. The engaging portion 54 is fitted to and holds the circular portion of the speed reducer 32d, which covers the worm wheel, when the motor 32 is press fitted to the cover 51.

Figure 22:
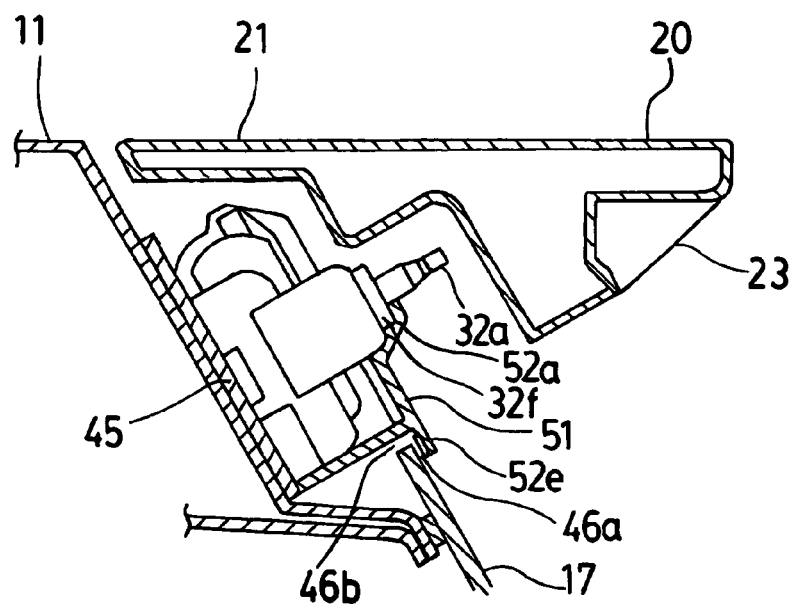
FIG. 22 is a cross sectional view taken along line XXII-XXII in FIG. 21.

Furthermore, as shown in FIGS. 18 and 22, the protruding portion 52a, which only covers one half of the entire circumference of the pivot shaft 32a, is formed in the top wall 51a of the cover 51. The protruding portion 52a has a generally semi-circular peripheral wall, which includes a generally conical inner surface with a decreasing curvature that decreases toward the lower end of the protruding portion 52a to fit with the bearing portion 32f that supports the pivot shaft 32a.

As described above, the engaging portions 53, 54 and the protruding portion 52a are formed, so that the cover 51 can be fixed to the motor 32.

The cover 51 of the first modification of the second embodiment has a flange 52e, which is formed by extending the edge of the top wall 51a of the cover 51 on the glass 17 side. The flange 52e is configured as the generally rectangular plate that projects from the top wall 51a.

The motor 32 and the cover 51 are assembled together in the manner similar to that of the second embodiment.

As discussed above, the cover 51 is formed as the half-cover, which covers about upper two third of the glass 17 side half of the motor 32, so that the size of the cover 51 can be further reduced, and the appearance of the motor 31 can be improved.

Even thought the cover 51 is formed as the half-cover, the side (the vehicle front end side) of the motor 32, which is opposite from the glass 17, is covered with the rear spoiler 20, as shown in FIG. 22. Thus, the side of the motor 32, which is opposite from the glass 17, can be protected from the rain/wind as well as the high pressure of the car washing machine, thereby substantially eliminating the problem with respect to the water proof. Furthermore, the housing of the motor 32 itself can protect the motor 32 from the water and provides the protection against the direct high pressure.

The cover 44 of the second embodiment and the cover 51 of the present modification may be provided on the housing 35 of the first embodiment. In such a case, the inner surface of the cover 44 or the cover 51 may have engaging portions, which are engaged with the housing 35 instead of the engaging portions, which are engaged with the motor main body 32c, the speed reducer 32d and the drive circuit 32e of the motor 32. Furthermore, projections, which are engaged with the cover 44 or the cover 51, may be provided to the housing 35.

In this way, the housing 35 may be formed from an inexpensive material without coloring, and the cover 44, 51 may be colored in conformity with the model type of the vehicle or the color of the vehicle body, so that both of the housing 35 and the cover 44, 51 may be standardized. In addition, the appearance of the wiper mechanism 30 can be improved while achieving the standardization.

The second embodiment may be further modified as described in the following second modification. In the second embodiment, the wiper receiving recess 20a, which is provided to the backside section 22 of the rear spoiler 20, is communicated with the opening 22a, which is opened toward the glass 17 side. In place of this construction, as shown in FIGS. 23 to 25, which indicate the second modification, a wall portion 55, which covers the wiper mechanism 30, may be formed in a rear end of the wiper receiving recess 20a.

The basic structure of the rear spoiler 20 of the second modification is similar to that of the first embodiment, which is not described in the second embodiment for the sake of simplicity. The wiper receiving recess 20a, which forms the wiper receiving space, is formed in the interior of the rear spoiler 20. When the rear spoiler 20 is installed to the backdoor panel 11, the wiper receiving recess 20a is communicated with the recess 13, which is formed in the backdoor panel 11, as shown in FIG. 23. Similar to the first and second embodiments, a length of this wiper receiving recess 20a is generally one half of the length of the backside section 22 in the left-to-right direction of the vehicle. Furthermore, the wiper receiving recess 20a includes a center of the backside section 22 and is placed on the left side of the vehicle.

Figure 23:
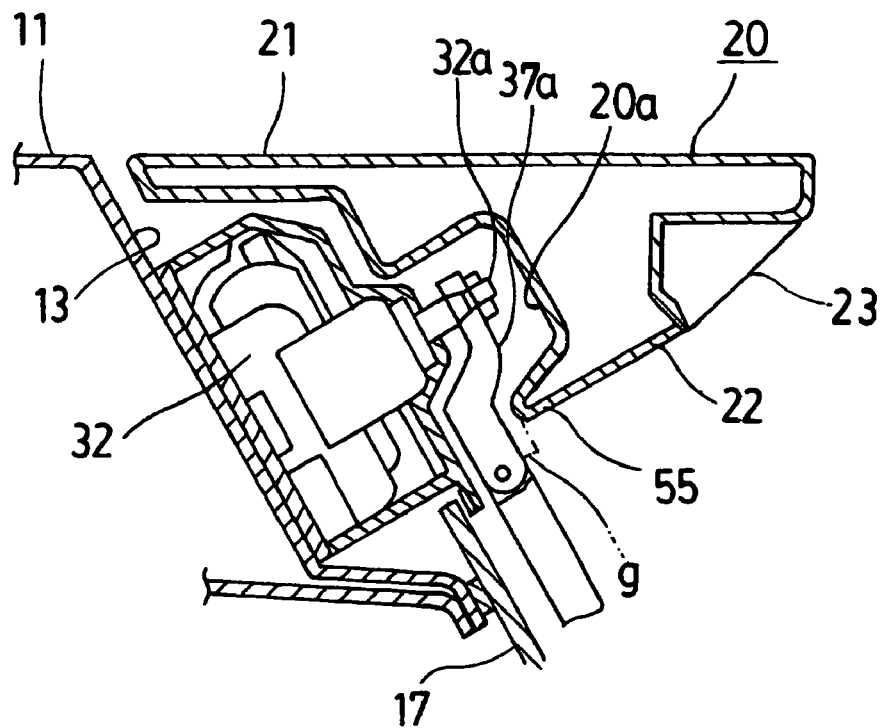
FIG. 23 is a cross sectional view, which is similar to FIG. 17 but showing a second modification of the second embodiment.
Figure 24:
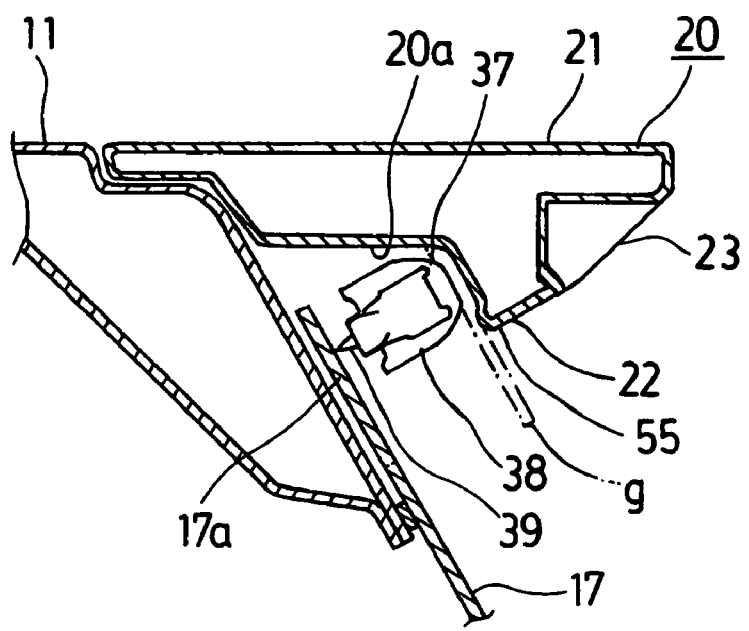
FIG. 24 is a cross sectional view, which is similar to a cross sectional view taken along line XXIV-XXIV in FIG. 16 but showing the second modification of the second embodiment.
Figure 25:
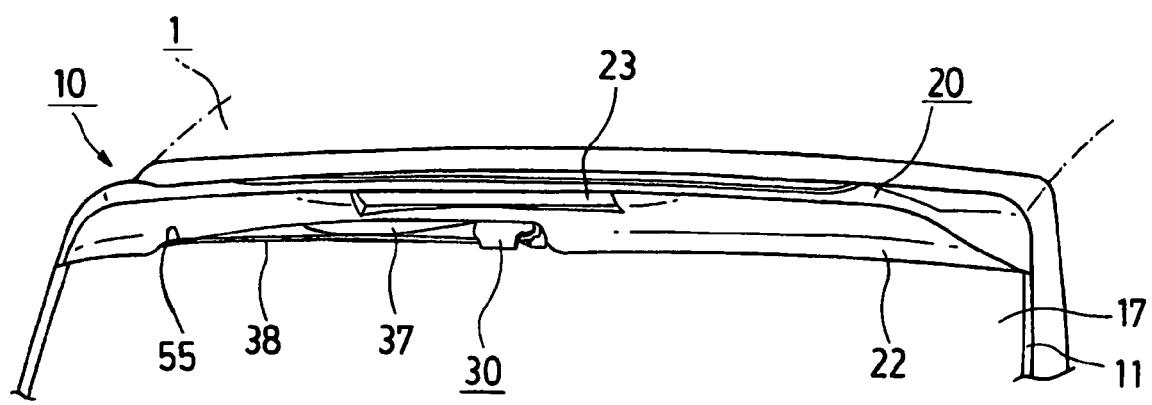
FIG. 25 is a rear perspective view of the backdoor apparatus in the second modification of the second embodiment.

The wall portion 55, which extends from the backside section 22, is provided to the glass 17 side end of the wiper receiving recess 20a, as shown in FIGS. 23 to 25. The wall portion 55 separates the water receiving recess 20a from the outside. A lower end of the wall portion 55 is spaced from the wiper arm head 37a, the wiper arm 37 and/or the wiper blade 38 by a predetermined space g to permit the swing movement of wiper arm head 37a, the wiper arm 37 and/or the wiper blade 38.

Thus, a space from the surface of the glass 17 to the distal end (the lower end) of the wall portion 55 depends on the height(s) of the wiper arm head 37, the wiper arm 37 and/or the wiper blade 38 from the surface of the glass 17. In the present modification, the wiper arm 37 has a greater height in comparison to that of the wiper arm head 37a, and the height of the wiper blade 38 progressively decreases toward the vehicle left side. Thus, as shown in FIG. 25, the size of the space, which is measured from the surface of the glass 17 to the distal end (the lower end) of the wall portion 55, is smallest at one portion, which covers the wiper arm head 37a, and is largest at another portion, which covers the wiper arm 37. Furthermore, the size of the space, which is measured from the surface of the glass 17 to the distal end (the lower end) of the wall portion 55, progressively decrease toward the vehicle left side at another portion, which covers the wiper blade 38.

The height of the wiper arm head 37a, the height of the wiper arm 37 and the height of the wiper blade 38 may be made smaller to further cover the wiper receiving recess 20a by decreasing the height of the distal end (the lower end) of the wall portion 55.

In the above-described rear spoiler 20, as shown in FIG. 25, the wall portion 55 can generally entirely cover the motor 32 of the wiper mechanism 30 and can also cover the top side of the wiper arm 37 and the wiper blade 38.

In this way, in the stop position as well as other operational positions of the wiper arm 37, the side (the vehicle front end side) of the motor 32, which is on the side of the wiper arm head 37a opposite from the glass 17, becomes substantially invisible, thereby improving the appearance. Furthermore, the wall portion 55 can serve as an effective protective wall for protecting the motor 32 against the application of the water in the case of, for instance, washing the vehicle in the high pressure car washer. Also, the wiper receiving recess 20a, which is formed in the rear spoiler 20, becomes less prominent, to improve the appearance and to protect the motor 32 from the application of the water.

Furthermore, the elastic member 44f, which is provided to the space between the flange 44e of the cover 44 and the glass 17 in the second embodiment, may be arranged to contact both the flange 44e and the glass 17 to improve the water proof performance. Also, similar to the second embodiment, a space may be provided between the flange 36e of the housing 35 and the glass 17 in the first embodiment, and the elastic member 44f may be provided to this space.

Additional advantages and modifications will readily occur to those skilled in the art. The invention in its broader terms is therefore not limited to the specific details, representative apparatus, and illustrative examples shown and described.

What is claimed is:

1. A backdoor apparatus for a vehicle, comprising:
a backdoor panel that supports a vehicle rear window glass;
a rear spoiler that projects from a top portion of the backdoor panel;
a wiper blade that wipes the rear window glass; and
a motor assembly that drives the wiper blade and is placed in a motor installation recess, which is formed externally in the top portion of the backdoor panel at a location below the rear spoiler, wherein the motor assembly includes:
a motor that has a pivot shaft, which is connected to the wiper blade to drive the wiper blade; and
a cover that at least partially covers a rear part of the motor, which is located on a vehicle rear end side of the pivot shaft, wherein the cover is arranged between the backdoor panel and the rear spoiler without directly contacting the rear window glass in such a manner that a portion of the cover at least partially overlaps with a top portion of the rear window glass in a direction generally perpendicular to a surface of the top portion of the rear window glass and is spaced from the top portion of the rear window glass.

2. The backdoor apparatus according to claim 1, wherein the cover uncovers a front part of the motor, which is located on a vehicle front end side of the pivot shaft.

3. The backdoor apparatus according to claim 1, further comprising a elastic member that is held in a space between the portion of the cover and the top portion of the rear window glass.

4. The backdoor apparatus according to claim 1, wherein:
the motor assembly further includes a plate that supports the motor and has at least one fixing portion; and
the at least one fixing portion is located outward of the cover and is fixed to the backdoor panel at a wall of the motor installation recess, which is other than a front wall of the motor installation recess that is provided on a vehicle front end side of the motor installation recess.

5. The backdoor apparatus according to claim 1, wherein:
the rear spoiler includes a wiper receiving recess, which is opened on a vehicle rear end side of the wiper receiving recess;
the wiper receiving recess at least partially overlaps with the motor installation recess of the backdoor panel in the direction generally perpendicular to the surface of the top portion of the rear window glass; and
the wiper blade is received in the wiper receiving recess when the wiper blade is placed in a predetermined rest position.

6. The backdoor apparatus according to claim 1, wherein:
the rear spoiler includes a wiper receiving recess, which is opened on a vehicle rear end side of the wiper receiving recess;
the wiper receiving recess at least partially overlaps with the motor installation recess of the backdoor panel in the direction generally perpendicular to the surface of the top portion of the rear window glass; and
the wiper receiving recess of the rear spoiler includes a rear wall, which is located on the vehicle rear end side of the pivot shaft and extends in the direction that is generally perpendicular to the surface of the top portion of the rear window glass.

7. The backdoor apparatus according to claim 1, wherein a length of the cover, which is measured in a left-to-right direction of the vehicle, is equal to or greater than a length of the motor, which is measured in the left-to-right direction of the vehicle.

8. The backdoor apparatus according to claim 1, wherein:
the portion of the cover is a generally planar flange; and
the cover extends from the flange to a point that is adjacent to the pivot shaft.

9. A backdoor apparatus for a vehicle, comprising:
a backdoor panel that supports a vehicle rear window glass;
a rear spoiler that projects from a top portion of the backdoor panel;
a wiper blade that wipes the rear window glass; and
a motor assembly that drives the wiper blade and is placed in a motor installation recess, which is formed externally in the top portion of the backdoor panel at a location below the rear spoiler, wherein:
the rear spoiler includes a wiper receiving recess, which is opened on a vehicle rear end side of the wiper receiving recess;
the wiper receiving recess at least partially overlaps with the motor installation recess of the backdoor panel in a direction generally perpendicular to a surface of a top portion of the rear window glass;
the wiper blade is received in the wiper receiving recess when the wiper blade is placed in a predetermined rest position;
the rear window glass includes an extended portion, which extends upward from the rest of the rear window glass in such a manner that the extended portion at least partially overlaps with the motor installation recess in a left-to-right direction of the vehicle; and
the wiper blade contacts the extended portion of the rear window glass when the wiper blade is placed in the predetermined rest position.

10. The backdoor apparatus according to claim 9, wherein the extended portion of the rear window glass has a predetermined length, which is measured in the left-to-right direction of the vehicle and is larger than a length of the wiper blade, which is measured in the left-to-right direction of the vehicle upon placing the wiper blade in the predetermined rest position.

11. The backdoor apparatus according to claim 9, wherein the motor assembly includes:
a motor that has a pivot shaft, which is connected to the wiper blade to drive the wiper blade;
a housing that at least partially covers the motor and has a through hole, through which the pivot shaft is received; and a plate that supports the motor and has at least one fixing portion, which is fixed to the motor installation recess.

12. The backdoor apparatus according to claim 11, wherein a portion of the housing at least partially covers the top portion of the rear window glass.

13. The backdoor apparatus according to claim 11, wherein the housing has a washer nozzle, from which washer fluid is discharged over the rear window glass.

14. The backdoor apparatus according to claim 9, wherein the wiper receiving recess of the rear spoiler includes a rear wall, which is located on a vehicle rear end side of the wiper receiving recess and extends in the direction that is generally perpendicular to the surface of the top portion of the rear window glass.

15. A backdoor apparatus for a vehicle, comprising:
   a backdoor panel that supports a vehicle rear window glass;
   a rear spoiler that projects from a top portion of the backdoor panel;
   a wiper blade that wipes the rear window glass; and
   a motor assembly that drives the wiper blade and is placed in a motor installation recess, which is formed externally in the top portion of the backdoor panel at a location below the rear spoiler, wherein:
   the rear spoiler includes a wiper receiving recess, which is opened on a vehicle rear end side of the wiper receiving recess;
   the wiper receiving recess at least partially overlaps with the motor installation recess of the backdoor panel in a direction generally perpendicular to a surface of a top portion of the rear window glass;
   the wiper blade is received in the wiper receiving recess when the wiper blade is placed in a predetermined rest position;
   the motor assembly includes:
      a motor that has a pivot shaft, which is connected to the wiper blade to drive the wiper blade; and
      a cover that at least partially covers a rear part of the motor, which is located on a vehicle rear end side of the pivot shaft; and
   the cover is arranged between the backdoor panel and the rear spoiler without directly contacting the rear window glass in such a manner that a portion of the cover at least partially overlaps with the top portion of the rear window glass in the direction generally perpendicular to the surface of the top portion of the rear window glass and is spaced from the top portion of the rear window glass.

* * * * *